Feb. 6, 1934.    A. R. JOHNSON    1,945,552
RAKE
Filed May 27, 1933    2 Sheets-Sheet 1

INVENTOR
AXEL R. JOHNSON
BY Harry Tunick
ATTORNEY

Feb. 6, 1934.  A. R. JOHNSON  1,945,552
RAKE
Filed May 27, 1933  2 Sheets-Sheet 2
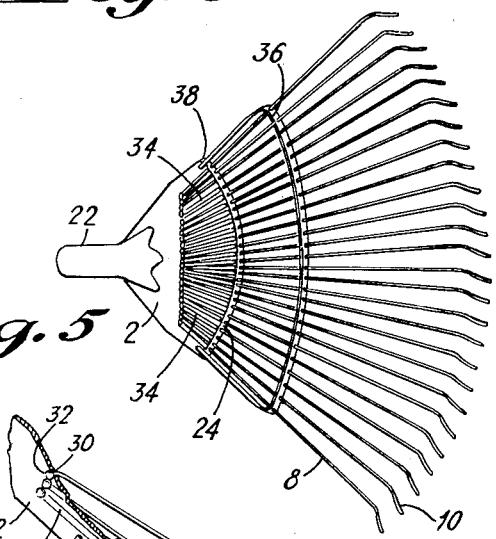
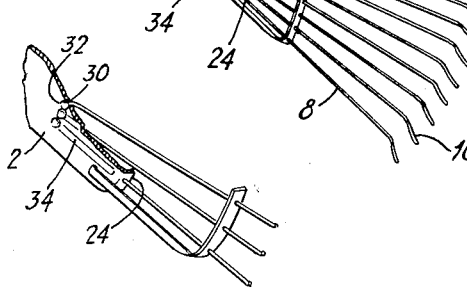
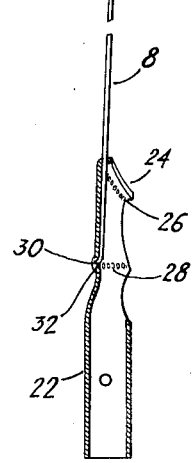
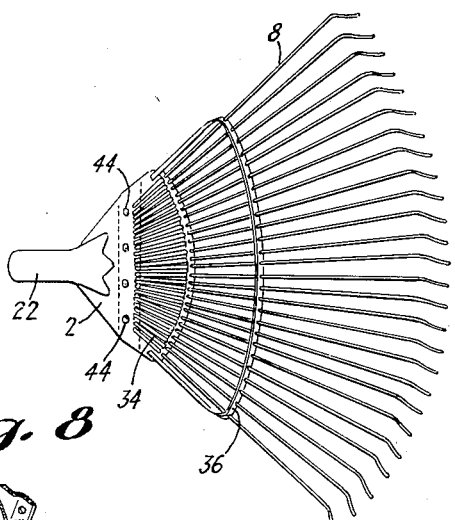
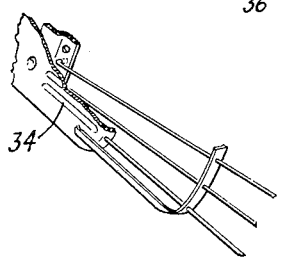
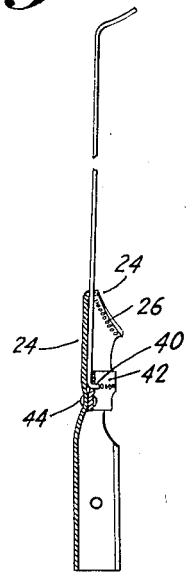
INVENTOR
AXEL R. JOHNSON
BY *Harry Tunick*
ATTORNEY Patented Feb. 6, 1934

1,945,552

UNITED STATES PATENT OFFICE 1,945,552

RAKE

Axel R. Johnson, White Plains, N. Y.

Application May 27, 1933. Serial No. 673,156

3 Claims. (Cl. 55—114)

My present invention relates to an improved steel fan rake which is particularly adapted and useful for the following and other purposes: for garden and lawn use; cultivating shrubs and flowers; cutting crab grass; removing grub; for lawn seeding; for removing mowed grass and wet or dry leaves; for leveling top soil; for golf courses either upon the greens or fairways; for general use in driveways, as for example where cinders or blue stone gravel require attention; and for the general promotion and cultivation of healthy grass and the like.

Among the objects of my invention are the provision of a rake adapted to have a long life and give real service, to provide a rake simple in mechanical structure and consequently inexpensive to manufacture, and furthermore to provide a rake which is mechanically strong, attractive and very effective in action.

My present invention, in accordance with statutes in such cases made and provided for, is described in greater detail with the aid of the accompanying drawings in order that the structural organization and mode of operation of my improved rakes may more readily be understood. Referring to the drawings, which, it is to be clearly understood, are to be considered in no way limitative but merely illustrative of my improvements in rakes;

Figures 3, 4 and 5 illustrate in perspective, in cross-section and in part-section, a modification of my improved rake in which the rake pins or teeth are welded to a rake head or sector plate; and, Figures 6, 7 and 8 illustrate in, respectively, perspective, cross-section and in part-section the preferred form of my new rake.

Figure 1:
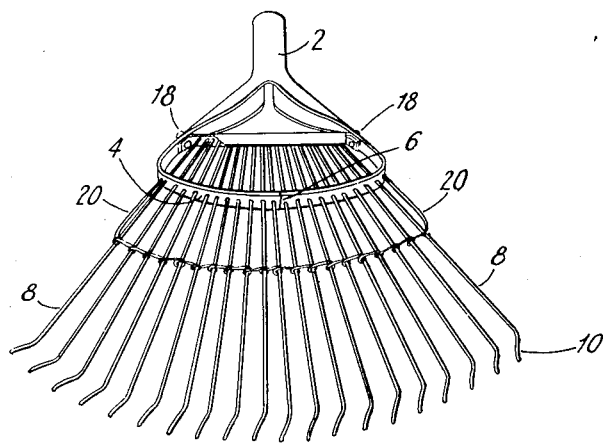
Figures 1 and 2 are perspective and sectional views respectively of one form of my improved rake.
Figure 2:
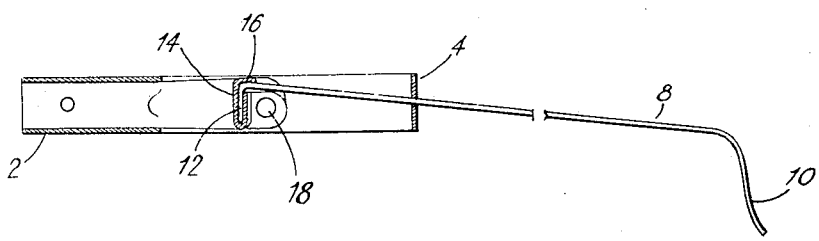

Turning to Figure 1 which illustrates one form of my improved rake, the head plate 2 is stamped from any desirable metal such as steel, and bent as illustrated so that the portion 4 can be welded at 6 so as to form a curved edge for the rake head plate. In other words, the rake will have a base or pin supporting element in the form of a metallic sector, the outer periphery or edge 4 of which is perforated so as to receive a plurality of rake pins, tines, or teeth 8, which preferably are made of spring steel. The outermost ends 10 of the rake pins 8 are bent at right angles to the longitudinal axes of the pins or teeth and are curved slightly outwardly to improve raking action. The innermost ends 12 of the pins 8 are also bent as illustrated in Figure 2 substantially at right angles to the teeth 8 and are placed within the U-shaped cross member or channel 14 whose vertical sides may be corrugated, if desired, so as to clamp individually and fixedly, and without side motion, the pins 8. The top 16 of the cross member 14 may then be bent over as illustrated in Figure 2 so as to maintain the pins locked into the U-shaped cross member or bar 12 which, in turn, may be bolted to, or preferably riveted to, the sides of the sector shaped head plate.

The wire 20 is coiled as illustrated in Figure 1 about each of the pins 8 and fastened in any suitable way to the edge 4 of the sector head plate. The wire 20 forms a means, therefore, for maintaining the raking ends of the tines in substantially predetermined desired spacial relationship.

In the rake shown in Figures 3, 4 and 5, the sector shaped head plate 2 is, as before, stamped from a suitable metal such as sheet steel although other metals such as iron, aluminum, brass and the like may be used if desired. The stamping process provides the handle or rod receiving portion 22 as well as the flanged curved lip or edge 24 which may be seen more clearly in Figures 4 and 5. The stamping process also perforates the lip or edge with a plurality of aligned tine, teeth or pin receiving orifices, perforations or holes 26. The stamping process, moreover, perforates the sector plate 2 with a plurality of holes 28 which can receive the innermost bent-up ends 30 of the teeth 8 which are bent as before at their outermost ends 10. The innermost right angled bent-up ends of the tines 8 may then be welded over as at 32, or, if desired, merely hammered over into fixed relationship with regard to the sector 2.

It should be noted that not only do the pins come through the orifices or holes 26, 28, but they also rest within the radial ribs, furrows, ridges or indentations 34 stamped into the sector plate 2. These ribs not only serve to maintain the rake pins in correct alignment but also serve to strengthen the sector plate 2. As a further aid to maintaining the pins in correct alignment, a perforated strap 36 is provided which is fastened at its otherwise free ends 38 in any suitable way as by passing through perforations within the sector shaped head 2.

In the form of my invention illustrated in Figures 6, 7 and 8, I have shown an arrangement wherein the rather expensive job of welding necessary in connection with the arrangements shown in Figures 3, 4 and 5, may be dispensed with. Turning to Figures 6, 7 and 8, the pins 8, which are made of spring steel so as to be resilient and useful for raking purposes, pass through the perforations in the retaining strap 36 which as before is fastened to the metallic stamped sector plate 2. The pins 8 at their innermost ends lie in radial grooves 34 stamped in the sector head plate 2 and are bent downwardly at right angles, as illustrated in Figure 7, at 40 into perforations in a depressed holding member or plate 42 which is securely fastened as by bolting and preferably by rivets 44 to the sector element 2. Needless to say, the pins are brought through the holes 26 in the lip 24 of the metallic sector 2.

Numerous minor changes may be made in the construction of my improved rake as will be apparent to those skilled in the art. For this reason, therefore, my present invention is not to be considered in any way limited by the illustrations given, but is to be given the full scope indicated in the appended claims.

Having thus described my invention, what I claim is:

1. A rake comprising a metallic head plate, said head plate having a curved peripheral edge and a plurality of radial grooves, said edge having a plurality of rake teeth receiving holes, a plurality of rake teeth, said teeth at their outer raking ends being curved at substantially right angles to the longitudinal dimensions of said teeth, the innermost ends of said teeth being bent at right angles to the longitudinal axes of said teeth and protruding through a plurality of aligned holes in said head plate, the protruding ends being welded to said metallic head plate, said rake teeth at the rake head portions thereof lying in the radial grooves of said metallic head plate, and means fastened to each of said teeth and to said rake head plate for maintaining separation of said teeth at their free raking ends.

2. A rake comprising a metallic sector having a curved flanged edge, said edge having a plurality of rake pin receiving holes, the body of said sector having a plurality of radial grooves in which rake pins may rest, a plurality of rake pins lying in the perforations in said flanged edge and lying in said radial grooves, said pins being turned at right angles at their innermost ends, a depressed holding plate perforated so as to engage the bent innermost ends of said pins, means for fastening said plate against said sector whereby said rake pins are maintained firmly against said sector and a perforated strap spaced from said sector through which said rake pins pass, said strap being bent and fastened at its bent ends to said sector so as to maintain said strap in the desired spacial relation from said sector.

3. A rake comprising a metallic head plate of sector shape, said head plate having a curved peripheral edge and a plurality of radial grooves, said edge having a plurality of rake teeth receiving holes, a plurality of rake teeth, said rake teeth at their outer raking ends being curved at substantially right angles to the longitudinal dimensions of said teeth, the innermost ends of said teeth being bent at right angles to the longitudinal axes of said teeth, said rake head having a portion adapted to receive the innermost bent ends of said teeth, said teeth at the rake head portions thereof lying in said radial grooves, means for fixing said bent ends to said rake head, and means fastened to each of said teeth and to said rake head plate for maintaining separation of said teeth at their free raking ends.

AXEL R. JOHNSON.